US 6,560,379 B2

(12) United States Patent
Ikeda et al.

(10) Patent No.: US 6,560,379 B2
(45) Date of Patent: May 6, 2003

(54) VARIABLE OPTICAL FILTER UNIT AND VARIABLE GAIN EQUALIZING SYSTEM

(75) Inventors: Kazuhiro Ikeda, Tokyo (JP); Hiroshi Matsuura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/040,973

(22) Filed: Jan. 2, 2002

(65) Prior Publication Data

US 2002/0150340 A1 Oct. 17, 2002

(30) Foreign Application Priority Data

Mar. 9, 2001  (JP) ........................................ 2001-067196

(51) Int. Cl.⁷ ................................................ G02B 6/00
(52) U.S. Cl. .............................. 385/11; 385/31; 385/33; 385/36; 385/47; 385/140; 359/115; 359/122
(58) Field of Search ............................... 385/11, 31, 33, 385/36, 39, 47, 140; 359/115, 122

(56) References Cited

U.S. PATENT DOCUMENTS

| | | | | |
|---|---|---|---|---|
| 4,529,262 A | * | 7/1985 | Ashkin et al. ............ | 350/96.15 |
| 5,579,420 A | * | 11/1996 | Fukushima ................ | 385/11 |
| 5,724,165 A | * | 3/1998 | Wu .............................. | 359/117 |
| 6,018,411 A | | 1/2000 | Fukushima et al. | |
| 6,266,474 B1 | * | 7/2001 | Han et al. ................... | 385/140 |
| 6,268,954 B1 | | 7/2001 | Cheng | |
| 6,466,704 B1 | * | 10/2002 | Frisken ...................... | 385/11 |

FOREIGN PATENT DOCUMENTS

| | | |
|---|---|---|
| EP | 0 932 068 A2 | 7/1999 |
| EP | 0 959 375 A2 | 11/1999 |
| EP | 1 033 834 A2 | 9/2000 |
| JP | 06-130339 | 5/1994 |
| JP | 11-212044 | 8/1999 |

OTHER PUBLICATIONS

Francon, M., "Birefringent filters and their recent developments", Proceedings of the SPIE–The Inernational Society for Optical Eng., vol. 380, pp. 457–463, (1983).

Parry, S.P., et al., "An ultra flat Erbium doped fibre amplifier with wide dynamic range using an adaptive gain flattening filter", Optical Amplifiers and Their Applications Technical Digest 2000, pp. 64–66, (2000).

Shimojoh, N., et al., "Compensation of L–band Gain–Wavelength Characteristics Using Linear and Second–order Variable Gain Equalizers", Optical Amplifiers and Their Applications Technical Digest 2000, pp. 170–172, (2000).

* cited by examiner

*Primary Examiner*—Akm E. Ullah
*Assistant Examiner*—Jennifer Doan
(74) *Attorney, Agent, or Firm*—Knobbe, Martens, Olson & Bear LLP

(57) ABSTRACT

Between a lens of a collimator and a retro-reflector as a total reflecting element, a prism, a polarizer, a Faraday rotator and a linear retarder are arranged in the order. The core/clad section serving as an input optical fiber of the collimator has its optical axis coincident with an optical axis of the lens. When the light exited the collimator reaches the retro-reflector, the outgoing light reflects deviated by a spacing Y, the returning light of which is refracted by the prism and incident on the core/clad serving as an output optical fiber of the collimator.

14 Claims, 11 Drawing Sheets

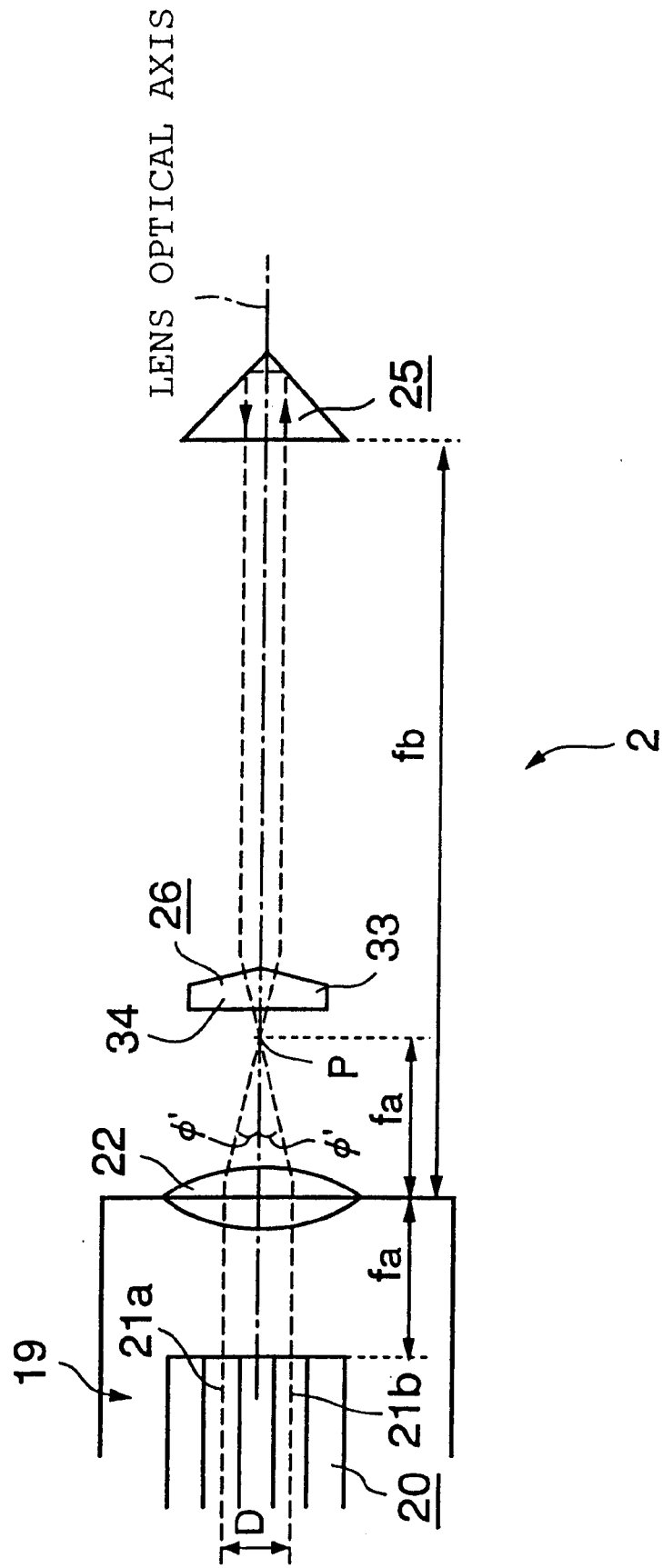

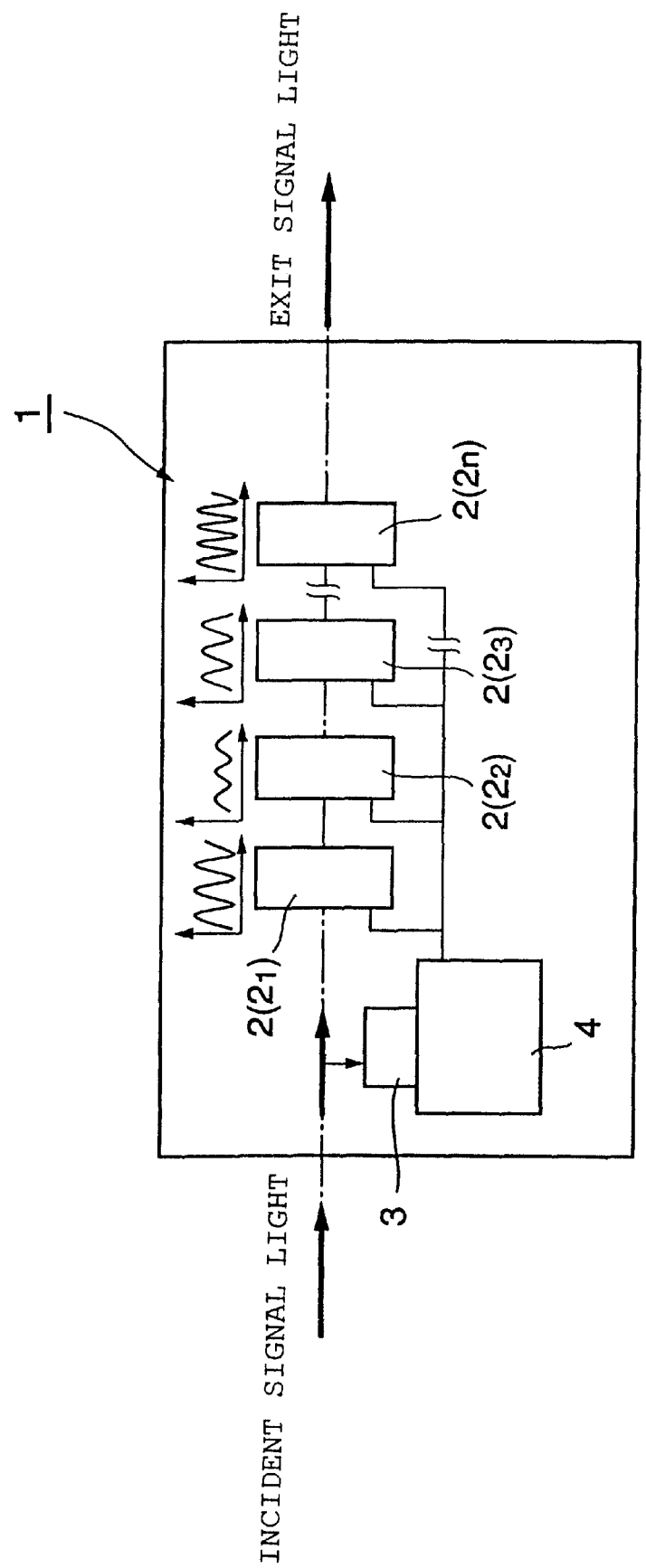

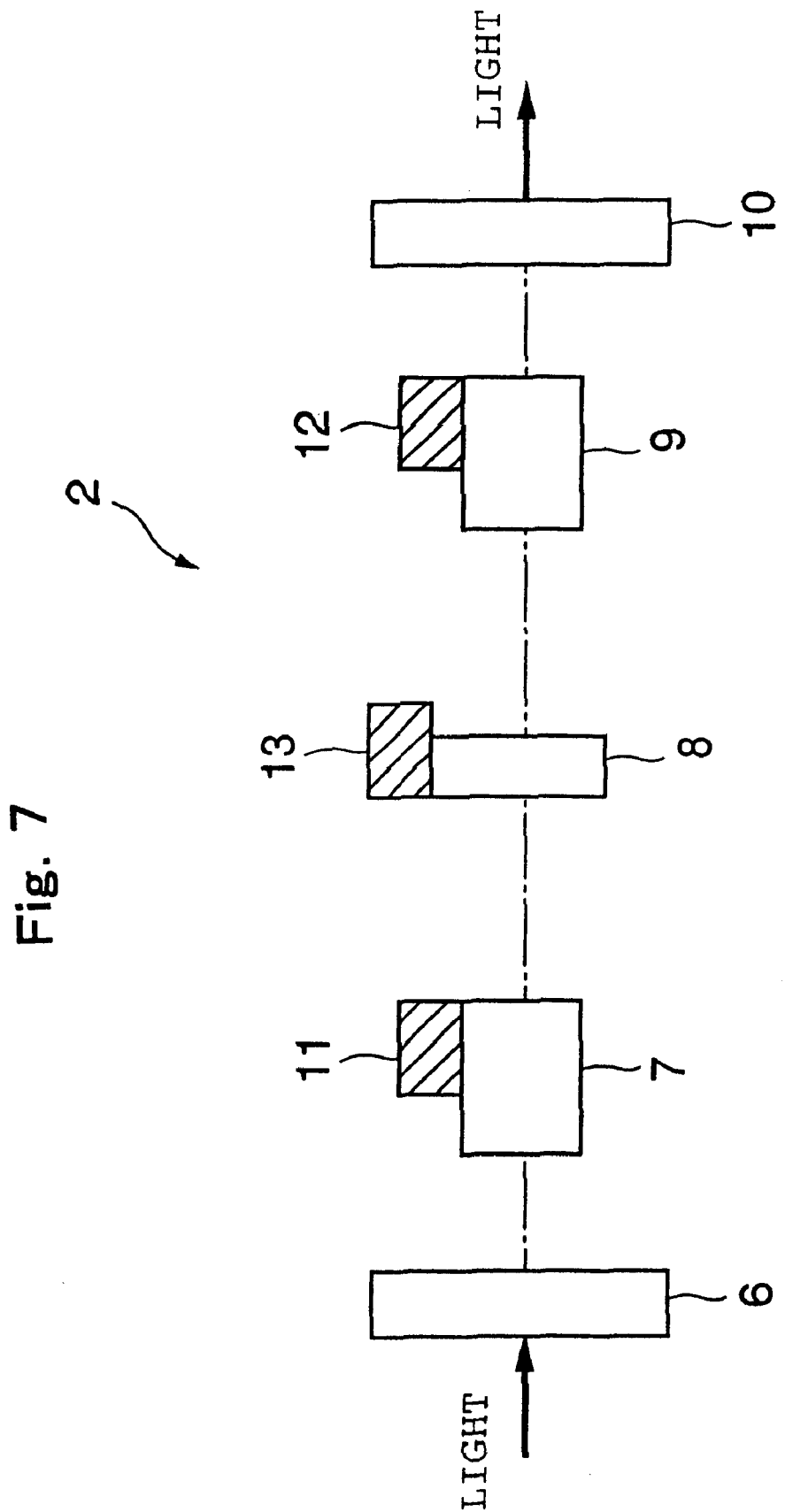

VARIABLE OPTICAL FILTER UNIT AND VARIABLE GAIN EQUALIZING SYSTEM

BACKGROUND OF THE INVENTION

1. Field of the Invention

The present invention relates to a variable optical filter unit for varying a wavelength characteristic of incident signal light and a variable gain equalizing system for compensating for wavelength characteristic variation in input signal light.

2. Description of the Related Art

Recently, research and development has been made on Wavelength Division Multiplexing (WDM) long-distance optical transmission in the field of optical communications. In the WDM long-distance optical transmission system, a plurality of optical amplifiers (e.g. EDFAs (Erbium-Doped Optical Fiber Amplifiers)) are inserted on the optical transmission line.

However, because the optical amplifier in a use wavelength band is different in gain depending upon a wavelength, the signal light passed the optical amplifier is different in light amount due to the wavelength. In the WDM long-distance optical transmission system, because the signal light passes a plurality of optical amplifiers, there is cumulative increase of difference in signal light amount between the wavelengths. This causes great difference in signal light amount between wavelengths on channels. This results in difference in the ratio of noise magnitude to light amount of the signal (S/N ratio) between channels (wavelengths) and hence makes impractical.

The countermeasure to the problem resulting from the optical-amplifier gain characteristic includes, for example, the means to incorporate a gain equalizer individually in each optical amplifier or insert a plurality of gain equalizers on the optical transmission line so that the difference in signal light amount between wavelength caused by the optical amplifiers can be compensated for by the gain equalizers thereby equalizing the signal light amount on every wavelength.

Conventionally, the gain equalizer has been configured with using an optical filter (e.g. dielectric multi-film filter, etalon filter, Mach-Zehnder filter) having a fixed light attenuation amount wavelength characteristic as a relationship between a light attenuation amount and a wavelength, on the assumption that the optical amplifier is steady in gain characteristic.

However, actually the optical-amplifier gain characteristic is not steady but varies due to the variation in input-signal light amount resulting from aging deterioration of the optical fiber constituting the optical transmission line or cut-working of the optical fiber upon extension of optical transmission line, or the variation in excitation state of the optical amplifier medium resulting from external disturbance such as temperature change in the environment of installing the optical amplifiers. Consequently, there are cases that the difference in input signal light amount between wavelengths cannot be satisfactorily compensated for by the gain equalizer utilizing an optical filter fixed in light attenuation amount wavelength characteristic.

Considering the above, there have been recent proposals on the variable gain equalizers capable of varying the light attenuation amount wavelength characteristic. Various variable gain equalizers have been proposed, e.g. variable gain equalizers under thermo-optical control on the principle of a waveguide-type diffraction grating and Mach-Zehnder interferometer, variable gain equalizers with mechanical means on the principle of a split-beam Fourier filter, variable gain equalizers for gain-inclination correction comprising a variable optical filter unit on the principle of a birefringence filter having a sinusoidal-like filter characteristic, variable gain equalizers comprising a plurality of such variable optical filter units arranged in series and so on.

Of the plurality of proposed variable gain equalizers, the present inventor has an attention to the variable gain equalizer using the variable optical filter unit. The reason lies in, first, that the variable gain equalizer has a high reliability in variably controlling light attenuation amount wavelength characteristic because of a structure to variably control light attenuation amount wavelength characteristic under electric control. Second, the variable optical filter unit is easy to manufacture and low in price because of the capability of manufacturing by a bulk structure that optical elements are arranged in a free space to provide action to transmission light. Third, where the plurality of variable optical filter units are arranged in series to structure a variable gain equalizer, light attenuation amount wavelength characteristic can be varied in various ways by individually controlling the variable optical filter units. Thus, light attenuation amount wavelength characteristic is high in freedom in variable setting.

FIG. 5 typically shows a system example of a variable gain equalizer using the plurality of variable optical filter units. The variable gain equalizing system 1, shown in FIG. 5, is structured with a plurality of variable optical filter units 2 ($2_1, 2_2, \ldots 2_n$ (n is an integer equal to or greater than 2)), monitor means 3 and pattern form control means 4. The variable optical filter units 2 each possess a sinusoidal-like light attenuation amount wavelength characteristic. The variable gain equalizing system 1 is configured for producing a compensating light attenuation amount wavelength characteristic as shown at the curve A' in FIG. 6B for compensating for am input-signal-light (incident signal light) wavelength characteristic, e.g. as shown at the curve A in FIG. 6A, by adding together the sinusoidal-like light attenuation amount wavelength characteristics of the variable optical filter units 2, to output signal light nearly equal in light amount at every wavelength as shown in FIG. 6C. Note that the sinusoidal-like includes not only a sinusoidal-like form but also the waveforms approximate in form to the sinusoidal-like form throughout this specification.

In the variable gain equalizing system 1, for example the monitor means 3 monitors a wavelength characteristic of an input signal. Depending on the result of monitor, the pattern-form control means 4 individually controls the variable optical filter units 2 to control at least one of amplitude and phase of the sinusoidal-like light attenuation amount wavelength characteristic of each variable optical filter unit 2, thereby variably controlling the light attenuation amount wavelength characteristic for compensating the variable gain equalizing system 1. specifically, where for example input signal light has a waveform characteristic as shown at curve A in FIG. 6A, produced is a light attenuation waveform characteristic for compensation as shown at the curve A' in FIG. 6B. Meanwhile, where the input signal light is changed to a waveform characteristic as shown at the curve B in FIG. 6A, the pattern-form control means 4 individually controls the variable optical filter units 2, to variably control the amplitude or phase of the sinusoidal-like light attenuation waveform characteristic of each of the variable optical filter units 2. By adding together the sinusoidal-like light attenuation amount wavelength characteristics of the variable optical filter units 2, a light attenuation amount wavelength characteristic for compensation is produced as shown at the curve B' in FIG. 6B.

The variable gain equalizing system 1 shown in FIG. 5, capable of changing the light attenuation amount wavelength characteristic for compensation in various ways as in the foregoing, can output signal light nearly constant in light amount regardless of wavelength as shown in FIG. 6C even where the wavelength characteristic of input signal light varies.

FIG. 7 typically shows a configuration example of a variable optical filter unit 2 for constituting the variable gain equalizing system 1. The variable optical filter unit 2 shown in FIG. 7 is configured to have a polarizer 6, a Faraday rotator 7, a linear retarder 8, a Faraday rotator 9 and a analyzer 10 arranged in the order on a light propagation path. Further, provided are magnetic-field applying devices 11, 12 to apply magnetic field to the Faraday rotators, 7, 9 and temperature control device 13 to control the temperature of the linear retarder 8.

The Faraday rotator 7, 9, structured of magneto-optical crystal, e.g. YIG (Yttriun-iron-garnet), utilizes the Faraday effect to rotate a polarization state of input light depending on a magnitude of magnetization in a light propagation direction due to a magnetic field applied by the magnetic-field applying devices 11, 12. The magnetic-field applying means 11, 12 variably control the magnitude of a magnetic field applied to the Faraday rotators 7, 9 thereby variably controlling the magnitude of magnetization in a light propagation direction in the Faraday rotator 7, 9 and hence variably controlling the rotation angle (Faraday rotation angle) θ in the polarization state of input light by the Faraday rotators 7, 9.

In the meanwhile, there exist microscopic gatherings of magnetization called magnetic domains in a magneto-optical crystal (multi-domain structure). If a magnetic field is externally applied, the magnetic domain grows gradually into a greater magnetic domain. Finally, the magnetic domains are integrated into a state of saturated magnetization. In the state of multi-domain structure, optical transmission loss occurs due to diffraction loss caused by a multiplicity of domain boundaries. In order to reduce optical transmission loss, the magneto-optical crystal is desirably used in a saturated domain state.

Consequently, the magnetic-field applying devices 11, 12 preferably uses magnetic-field applying devices capable of variably controlling the magnitude of magnetic domains in the Faraday rotators 7, 9 in the light propagation direction while maintaining the saturated domain state of the Faraday rotators (magneto-optics crystal) 7, 9. Such a magnetic-field applying device includes various structures. Herein, any of the structures of magnetic-field applying device may be employed, and hence explanation thereof is omitted.

Note that the magnetic-field applying devices 11, 12 are controlled such that the Faraday rotators 7, 9 are equal in Faraday rotation angle θ, because of the reason hereinafter referred.

The linear retarder 8, formed of a birefringence crystal, e.g. quartz or rutile crystal, is a device to separate, with a phase difference, transmission light into a component polarizing in an optical-axis direction of the crystal and a component polarizing in a direction orthogonal to the optical-axis direction of the crystal. The temperature control device 13, for variably controlling the temperature of the linear retarder 8 itself, is structured, for example, by a Pertier device.

In the meanwhile, simulations have been made, using computation with Jones matrix, on how the amount of the signal light of after passing the optical variable filter unit 2 varies in the case of varying the Faraday rotation angle θ of the Faraday rotators 7, 9 and in the case of varying the temperature of the linear retarder 8. Due to this, it has been confirmed that the light attenuation amount wavelength characteristic of the variable optical filter unit 2 varies, as shown in FIG. 8, in the case the Faraday rotation angle θ is varied, and as shown in FIG. 9, in the case the temperature of the linear retarder 8 is varied.

The solid line A shown in FIG. 8 is for a Faraday rotation angle θ of 45°, the broken line B for a Faraday rotation angle θ of 55°, the broken line C for a Faraday rotation angle θ of 60°, the dotted line D for a Faraday rotation angle θ of 75° and the solid line E for a Faraday rotation angle θ of 90°.

As can be seen from the graph on the light attenuation amount wavelength characteristic shown in FIG. 8, the variable optical filter unit 2 has a sinusoidal-like light attenuation amount wavelength characteristic wherein it is seen that the sinusoidal-like waveform varies only in amplitude with variation in the Faraday rotation angle θ without change in phase and period.

The solid line A shown in FIG. 9 is on a waveform example of a light attenuation waveform characteristic in the variable optical filter unit 2 in a case the linear retarder 8 is at a temperature of 10° C. The dotted line B is on a case the linear retarder 8 is at a temperature of 20° C., and the dotted line C is on a case the linear retarder 8 is at a temperature of 30° C. As can be seen from the graph on the light attenuation waveform characteristic, it can be conformed that the sinusoidal-like waveform on the light attanuation waveform characteristic of the variable optical filter unit 2 varies in phase with variation in the temperature of the linear retarder 8 with the period unchanged.

As shown in FIGS. 8 and 9, the sinusoidal-like characteristic exhibited in the light attenuation waveform characteristic of the variable optical filter unit 2 is due to variation depending on a wavelength because the phase difference Δ in the separation light by the linear retarder 8 is of wavelength dependency. Also, when the temperature of the linear retarder 8 changes, the birefringence of the linear retarder 8 changes to vary the phase difference Δ of the separation light by the linear retarder 8 and accordingly the phase in the light attenuation amount wavelength characteristic of the variable optical filter unit 2 varies. On the contrary, the reason of no change of the period in the light attenuation amount wavelength characteristic of the variable optical filter unit 2 by temperature change in the linear retarder 8 is because the variation amount in the separation-light phase difference Δ due to the temperature change is not dependent upon a wavelength and nearly constant at every wavelength.

Namely, in the variable optical filter unit 2 shown in FIG. 7, the amplitude of the sinusoidal-like light attenuation amount wavelength characteristic of the variable optical filter unit 2 can be controlled by variably controlling the Faraday rotation angle θ of the Faraday rotators 7, 9. Also, by variably controlling the temperature of the linear retarder 8, the phase of the sinusoidal-like light attenuation amount wavelength characteristic of the variable optical filter unit 2 can be controlled. Namely, the temperature control means 13 functions as a phase difference varying device for controlling the separation-light phase difference Δ due to the linear retarder 8 to thereby vary the phase of the sinusoidal-like light attenuation amount wavelength characteristic of the variable optical filter unit 2.

Furthermore, the period of the sinusoidal-like light attenuation amount wavelength characteristic of the variable optical filter unit 2 is determined depending upon a crystal thickness in the light propagation direction of the linear retarder 8. Previously determined is a crystal thickness d in the light propagation direction of the linear retarder 8 for a predetermined period of the light attenuation amount wavelength characteristic. The linear retarder having a determined thickness d will be provided in the variable optical filter unit 2. Incidentally, although the crystal thickness in the light propagation direction of the linear retarder 8 is varied by variably controlling the temperature of the temperature control means 13, such variation is negligibly small and accordingly, if the temperature of the linear retarder 8 is varied, the period of the light attenuation amount wavelength characteristic will nearly not changed.

The polarizer 6 and the analyzer 10 are, respectively, configured by linear polarizers each comprising, e.g. a polarizing splitting wedge using a birefringence crystal not to change the amount of the light of after transmission by an incident light polarizing state.

The polarizer 6, the linear retarder 8 and the analyzer 10 are preferably arranged in the following relationship so that all the peaks on the sinusoidal-like waveform of the light attenuation amount wavelength characteristic of the variable optical filter unit 2 are rendered zero in transmission loss on principle as shown in FIG. 8 or FIG. 9. For example, when the polarizer 6 and the analyzer 10 are in an othogonal-Nicol relationship, the linear retarder 8 is provided such that the birefringence crystal constituting the linear retarder 8 in an optical axis direction inclines 45° relative to a direction of transmission through the polarizer 6 and analyzer 10. Meanwhile, when the polarizer 6 and the analyzer 10 are in a parallel-Nicol relationship, the linear retarder 8 is provided such that the crystal of the linear retarder 8 in the optical axis direction is parallel with a direction of transmission through the polarizer 6 and analyzer 10.

Also, the reason for controlling the magnetic-field applying device 11, 12 such that the Faraday rotators 7, 9 are equal in Faraday rotation angle θ as in the foregoing is in order to render zero in transmission loss on principle all the peak values on the sinusoidal-like waveform of the light attenuation amount wavelength characteristic of the variable optical filter unit 2, similarly to the above. In this manner, the reason for rendering all the peak values on the sinusoidal-like waveform of the light attenuation waveform characteristic zero in transmission loss is in order to reduce the amount of transmission loss in the variable gain equalizing system 1 as low as possible when the variable gain equalizing system 1 is architected by connecting a plurality of variable optical filter units 2 in series as shown in FIG. 5.

Note that the equal Faraday rotation angle θ in the Faraday rotators 7, 9 is in order for simplifying the configuration of control, besides the above reason.

Meanwhile, in the above example, the temperature control means 13 of the linear retarder 8 variably control the phase in the sinusoidal-like light attenuation waveform characteristic of the variable optical filter unit 2. However, it is possible to interpose a variable retarder using a Faraday rotator between the Faraday rotator 9 and the analyzer 10 without providing a temperature control means 13 as disclosed in JP-A-6-130339 so that the variable phaser can variably control the phase in the light attenuation amount wavelength characteristic of the variable optical filter unit 2.

In the meanwhile, there is a proposal on a variable optical filter unit 2 as shown in FIG. 10 in view of reducing the size and cost of the variable optical filter unit 2. The variable optical filter unit 2 shown in FIG. 10 has a polarizer 6, a Faraday rotator 7, a linear retarder 8, and a total reflecting mirror 18 as a total reflecting element, arranged in the order of light propagation direction. Also, provided are a magnetic-field applying device 11 for applying a magnetic field to the Faraday rotator 7 and a temperature control device 13 for variably controlling the temperature of the linear retarder 8. Note that, herein, the same structural parts as those of the variable optical filter unit 2 shown in FIG. 7 are denoted with the same reference numerals to omittedly explain the duplicated common parts.

In the variable optical filter unit 2 shown in FIG. 10, the light passed the polarizer 6 reaches the total reflecting mirror 18 through the Faraday rotator 7 and the linear retarder 8 in the order where it is totally reflected by the total reflecting mirror 18. The returning light is outputted from the polarizer 6 through the linear retarder 8 and the Faraday rotator 7 in the reverse order to the above. The variable optical filter unit 2 shown in FIG. 10 can act upon light to produce a sinusoidal-like light attenuation amount wavelength characteristic, similarly to the variable optical filter unit 2 shown in FIG. 7.

Incidentally, the polarizer 6 serves also as the analyzer 10 structuring the variable optical filter unit 2 shown in FIG. 7. In the case of FIG. 10, the polarizer 6 and the analyzer 10 are in a state equivalent to a parallel-Nicol relationship. Accordingly, the linear retarder 8 is preferably arranged in its crystal optical axis direction parallel with a direction of transmission through the polarizer 6.

In the meanwhile, it can be considered that a collimator 19 as shown in FIG. 11 be arranged at a light input/output section of the variable optical filter unit 2 shown in FIG. 10. The collimator 19 is integrated with a two-cored ferrule 20 and a lens 22. The two-cored ferrule 20 has optical-fiber cores/clads 21a, 21b arranged side by side through a spacing (e.g. 250 μm). One of the cores/clads 21a, 21b serves as an input optical fiber while the other as an output optical fiber.

In the case that such a collimator 19 is arranged at the light input/output section of the variable optical filter unit 2 of FIG. 10, the light outputted at a side serving as an input optical fiber of the cores/clads 21a, 21b is incident on the polarizer 6 through the lens 22. Then, as in the foregoing, the returning light totally reflected upon the total reflecting mirror 18 passes the lens 22 to enter and propagates to the other core/clad on the other side serving as the output optical fiber.

In the collimator 19 shown in FIG. 11, the cores/clads 21a, 21b are arranged symmetric about, as a center, an optical axis of the lens 22. In this case, in order that the light entered one of the cores/clads 21a, 21b is reflected upon the total reflecting mirror 18 and the returning light thereof enters the other core/clad, there is a need to make a spacing fa between a tip of the core/clad 21a, 21b and a principal plane of the lens 22 equal to a spacing fb between the principal plane of the lens 22 and the total reflecting mirror 18.

In the meanwhile, it is preferred to use a general-purpose collimator in consideration of cost reduction. However, in a general-purpose collimator, the spacing fa between the tip of the core/clad 21a, 21b and the principal plane of the lens 22 is approximately 1–4 mm. In order to employ a general-purpose collimator, there is a need to make the spacing fb between the lens 22 principal plane and the reflecting mirror 18 approximately 1–4 mm. However, there is extreme difficulty in arranging, in such a narrow gap, a polarizer 6, a Faraday rotator 7 and a linear retarder 8 and further a magnetic-field applying device 11 and a temperature control device 13.

This makes it impossible to use a general-purpose collimator. The use of an expensive collimator incurs cost increase for a variable optical filter unit 2 and a variable gain equalizing system using the same.

Meanwhile, for example, in the case of fabricating a collimator 19 by setting the spacing fb between the principal plane of the lens 22 of the collimator 19 and the total reflecting mirror 18 in order to facilitate the arrangement of the optical elements such as the Faraday rotator 7 as well as the spacing fa between the lens 22 and the tip of the core/clad 21a, 21b to an equal to the spacing fb, the collimator 19 is greater in size as compared to the general-purpose product, resulting in size-increase in a variable optical filter unit 2 and variable gain equalizing system 1.

Furthermore, it can be considered that, in order to avoid size increase of the collimator 19, optical elements such as a polarizer 6 be inserted between the lens 22 and the tip of the core/clad 21a, 21b. In this case, there is difficulty in adjusting the positions of the lens 22, the optical elements such as the polarizer 6 and tip of the core/clad 21a, 21b such that minimized is the optical coupling loss of the returning light totally reflected by the total reflecting mirror 18 with the core/clad 21 a or 21b, lowering production efficiency. In this case, the collimator 19 is expensive despite avoiding size increase of the collimator 19, resulting in cost increase of a variable optical filter unit 2 and variable gain equalizing system 1 similarly to the foregoing.

The present invention has been made in order to solve the above problem, and it is an object to provide a variable optical filter unit and variable gain equalizing system low in price and small in size by using a general-purpose collimator.

SUMMARY OF THE INVENTION

In order to achieve the object, a variable optical filter unit having a sinusoidal-like light attenuation amount wavelength characteristic having a integrated collimator with an input optical fiber and an output optical fiber that are arranged side by side and a lens arranged with a spacing to a tip of the input and output optical fibers commonly for input and output, the variable optical filter unit comprising: arranged on a light exit side of the collimator, in an order, a polarizer; and a total reflecting element for totally reflecting a signal light to return a propagation direction of the light; provided between the polarizer and the total reflecting element a Faraday rotator for rotating a polarizing plane of an incident light according to an applied magnetic field; a birefringence crystal for providing, depending on a wavelength, a phase difference between a component propagating with polarization in a crystal optical axis direction and a component propagating with polarization in a direction orthogonal thereto; and a phase difference changing device for changing, without depending on the wavelength, the phase difference between the component propagating with polarization in the crystal optical axis direction and the component propagating with polarization in the direction orthogonal thereto; a propagation light path changing element being provided to input and propagate a returning light totally reflected by the total reflecting element onto the output optical fiber of the collimator. This structure is means for solving the foregoing problem.

Also, a variable optical filter unit having a sinusoidal-like light attenuation waveform characteristic having a collimator integrated with a tip of an optical fiber and a lens arranged on a side of the tip of the optical fiber through a spacing, the variable optical fiber filter unit comprising: arranged on a light exit side of the collimator, in an order, a polarizer; and a total reflecting element for totally reflecting a signal light to return a propagation direction of the light; provided between the polarizer and the total reflecting element a Faraday rotator for rotating a polarizing plane of an incident light according to an applied magnetic field; a birefringence crystal for providing, depending on a wavelength, a phase difference between a component propagating with polarization in a crystal optical axis direction and a component propagating with polarization in a direction orthogonal thereto; and a phase difference changing device for changing, without depending on the wavelength, the phase difference between the component propagating with polarization in the crystal optical axis direction and the component propagating with polarization in the direction orthogonal thereto; a propagation path of the returning light totally reflected by the total reflecting element and directed toward the collimator being coincident with a propagation path of the outgoing light directed from the collimator toward the total reflecting element, an optical circulator being inserted on an optical fiber connected to the collimator.

BRIEF DESCRIPTION OF THE DRAWINGS

FIG. 2 is a model diagram typically showing a variable optical filter unit featured in a second embodiment;

FIG. 5 is an explanatory diagram typically showing one example of a variable gain equalizing system arranged with a plurality of variable optical filter units;

FIG. 7 is a diagram for explaining a related art variable optical filter unit constituting the variable gain equalizing system shown in FIG. 5;

DETAILED DESCRIPTION

Figure 1:
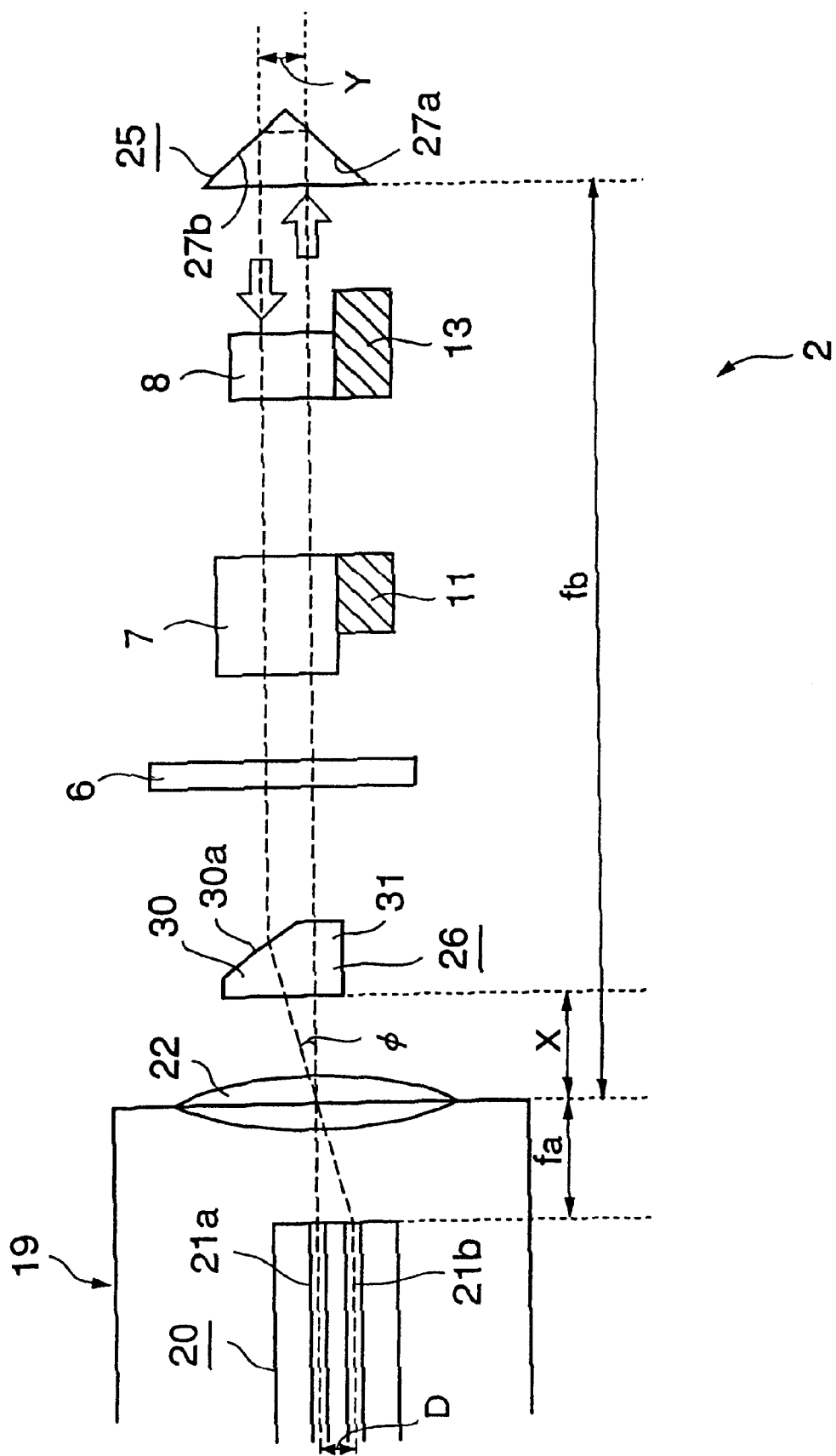
FIG. 1 is a model diagram typically showing a variable optical filter unit featured in a first embodiment.

Now embodiments of the present invention will be explained below with reference to the drawings.

A variable-gain equalizing system of a first embodiment is featured to have a variable optical filter unit unique in structure as explained below. The other structure is similar to that of the variable-gain equalizing system shown in FIG. 5. In the explanation on the first embodiment, the same constituent parts as those of the variable-gain equalizing system shown in FIG. 5 are designated with the same reference characters, to omittedly explain the duplicated common parts.

Figure 10:
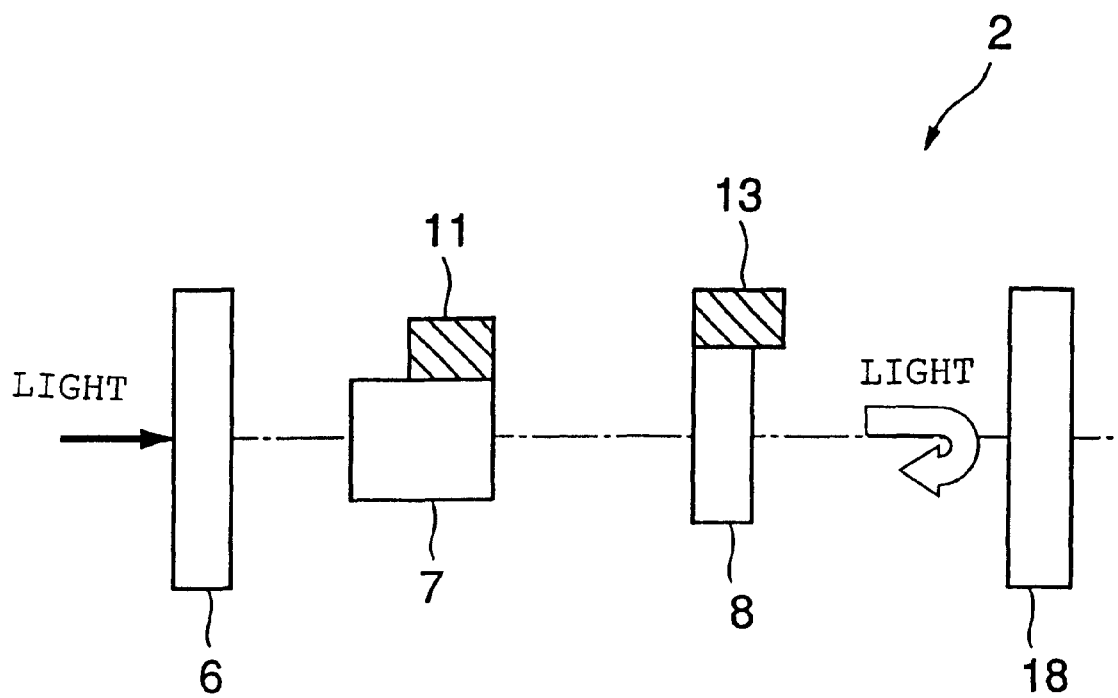
FIG. 10 is an explanatory view typically showing one example of a variable optical filter unit using a total reflecting element.
Figure 11:
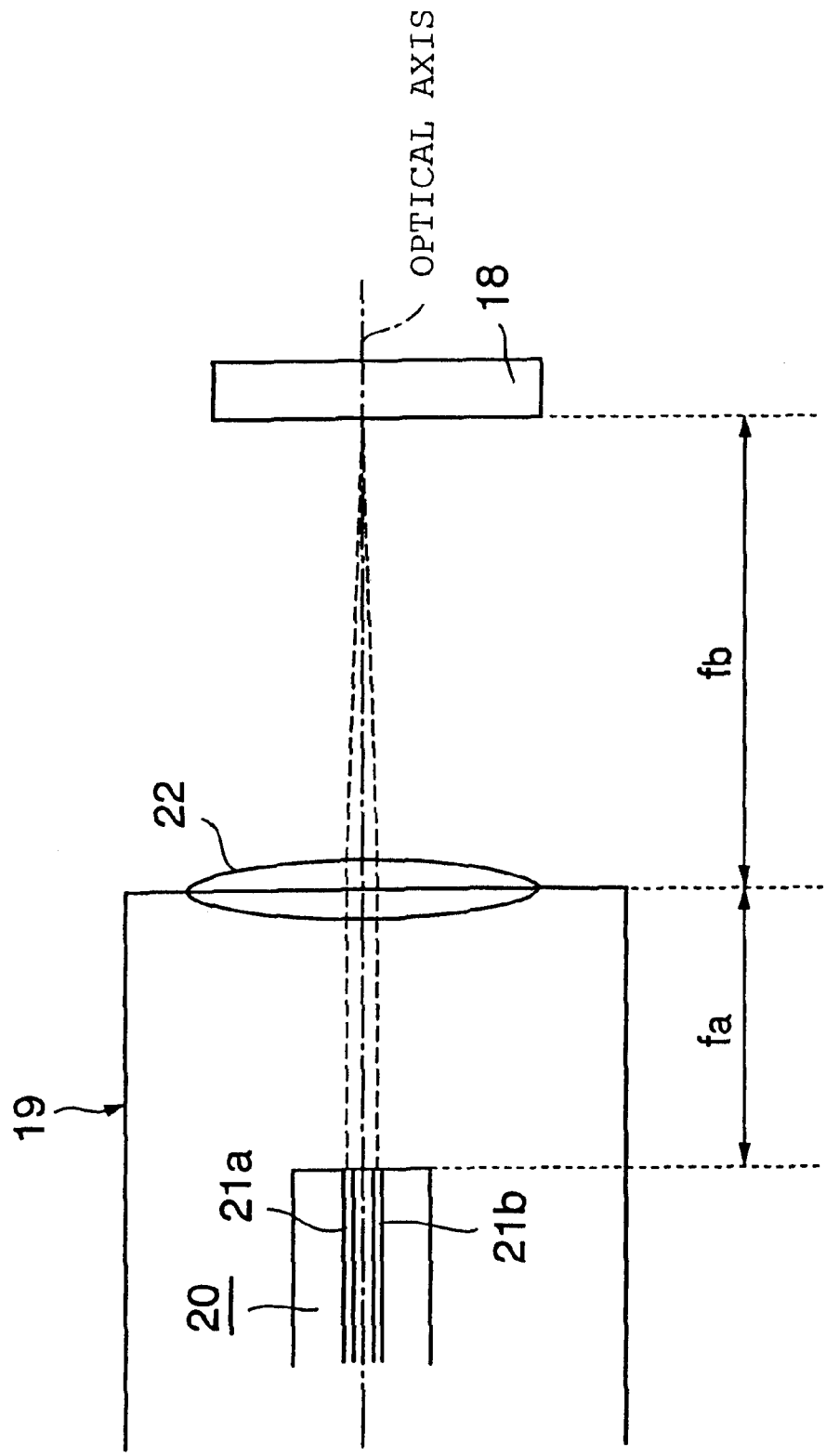
FIG. 11 is a model diagram for showing one example of a collimator to be provided at a light input/output section of the variable optical filter unit of FIG. 10.

FIG. 1 typically shows a structure of a variable optical filter unit featured in the first embodiment. The variable optical filter unit 2 is arranged, on a light propagation path, with a polarizer 6, a Faraday rotator 7, a linear retarder 8, and a retro-reflector 25 as a total reflection element, as shown in FIG. 1. Meanwhile, a collimator 19 is arranged with a lens 22 directed toward the polarizer 6. A prism 26 as a propagation-light path changing element is inserted on the light propagation path at between the lens 22 of the collimator 19 and the polarizer 6. Furthermore, a magnetic-field applying device 11 is provided to apply a magnetic field to the Faraday rotator 7, and a temperature control device 13 is provided to control the temperature of the linear retarder 8 and function as a phase-difference changing device. Note that the polarizer 6, the Faraday rotator 7, the linear retarder 8, the magnetic-field applying element 11 and the temperature control element 13 are similar in structure, respectively, to the constituent parts 6, 7, 8, 11 and 13 structuring the variable optical filter unit 2 of FIG. 7 or 10, and hence omittedly explained.

The collimator 19 is structured with the integral two-cored ferrule 20 and lens 22, as described before. In the first embodiment, an optical axis of one of the core/clad 21a, 21b of the two-cored ferrule 20 serving as an input optical fiber (core/clad 21a in the example of FIG. 1) is coincident with an optical axis of the lens 22.

The retro-reflector 25 has a first total reflecting surface 27a and a second total reflecting surface 27b. The first and second total reflecting surfaces 27a, 27b are arranged in an orthogonal relationship. In the example shown in FIG. 1, the retro-reflector 25 is arranged such that the first total reflecting surface 27a has an inclination of 45° relative to a direction of propagation of the light transmitted through the linear retarder 8. By thus arranging the retro-reflector 25, the ight propagated from the linear retarder 8 to the retro-reflector 25 is totally reflected upon the first total reflecting surface 27a and directed toward the second total reflecting surface 27b. The light is further totally reflected upon the second total reflecting surface 27b and propagated toward the polarizer 6. Thus, it is possible to make parallel, through a spacing Y, the propagation path for the outgoing light from the polarizer 6 toward the retro-reflector 25 and the propagation path for the returning light from the retro-reflector 25 toward the polarizer 6.

The prism 26 is structured with a returning-light refracting portion 30 and a parallel plate portion 31. The returning-light refracting portion 30 has a slant surface 30a having an inclination relative to a propagating direction of returning light. By the slant surfaces 30a, returning light is refracted in its light propagating direction and changed in light propagating direction to a direction incident on the core/clad 21b serving as the output optical fiber. Namely, the prism 26 serves as a propagation-light path changing element for the returning light to be incident and propagate onto the outputting optical fiber.

In order for the prism 26 to effect the function as the propagation-light path changing element, Equation 1 must be satisfied by an angle φ defined by a light propagating direction of the returning light having been refracted by the light refracting portion 30 of the prism 26 and an optical axis of the lens 22, and further Equation 2 be satisfied by a spacing X between the principal plane of the lens 22 and the prism 26 on the assumption that the returning-light refracting portion 30 is sufficiently small in thickness.

$$\phi = \tan^{-1} \frac{D}{fa}(rad) \qquad \text{[Equation 1]}$$

$$X = \frac{Y}{\tan\phi} \qquad \text{[Equation 2]}$$

Incidentally, D in Equation 1 designates a spacing between an optical axis of the core/clad 21a and an optical axis of the core/clad 21b, fa in Equation 1 designates a spacing between a tip of the core/clad 21a, 21b and the principal plane of the lens 22, Y in Equation 2 designates a spacing between a propagation path of the outgoing light from the polarizer 6 to the retro-reflector 25 as the total reflection element and a propagation path of the returning light totally reflected by the retro-reflector 25 and directed toward the polarizer 6 (in other words, deviation between the outgoing and returning light paths).

The returning-light refracting portion 30 of the prism 26 is formed in a form to satisfy Equation 1 and Equation 2, and the parallel plate portion 31 is formed in a form to transmit outgoing light without changing the direction of light propagation.

The first embodiment has the structure to make parallel the propagation path for the outgoing light of from the polarizer 6 to the retro-reflector 25 as a total reflecting element and the propagation path for the returning light totally reflected by the retro-reflector 25 and directed toward the polarizer 6, and further the structure to refract the returning light by the light refracting portion 30 of the prism 26 and be incident and propagate onto the core/clad 21b of the two-cored ferrule 20 serving as an outputting optical fiber of the collimator 19. Consequently, even if properly setting the spacing fb between the principal plane of the lens 22 and the retro-reflector 25 regardless of the spacing fa between the tip of the core/clad 21a, 21b and the principal plane of the lens 22, the returning light can be positively incident on the core/clad 21b by the prism 26 as the propagation light changing element.

This makes it easy to architect a variable optical filter unit 2 as in the foregoing by employing a general-purpose collimator, i.e. collimator having a spacing fa of approximately 1–4 mm between the tip of the core/clad 21a, 21b and the principal plane of the lens 22. Due to this, it is possible to provide an inexpensive, small-sized variable optical filter unit 2 and a variable-gain equalizing system 1 using the same.

Note that, in order to narrow the spacing X between the principal plane of lens 22 and the prism 26 in view of size-reducing the variable optical filter unit 2, it is desired to decrease the deviation of between the outgoing and returning light paths as demonstrated in Equation 2.

Explanation will be made below on a second embodiment.

FIG. 2 typically shows the major constituent parts extracted out of a variable optical filter unit featured in a variable-gain equalizing system of a second embodiment.

Note that, in explaining the second embodiment, the same structural parts as those of the foregoing variable-gain equalizing system 1 and variable optical filter unit 2 are designated with the same reference characters to omittedly explain the duplicated common parts. Meanwhile, although the variable optical filter unit 2 has the foregoing polarizer 6, Faraday rotator 7, linear retarder 8, magnetic-field applying device 11 and temperature control device 13, FIG. 2 omittedly shows them.

The variable optical filter unit 2 featured in the second embodiment is structured, as shown in FIG. 2, with a collimator 19 integrated with the two-cored ferrule 20 and the lens 22 in a state that the core/clads 21a, 21b of the two-cored ferrule 20 are symmetrically arranged about, as a center, the optical axis of the lens 22.

For employing such a collimator 19, the angle φ' defined between a propagation path of the returning light incident on the lens 22 toward one, serving as an outputting optical fiber, of the core/clads 21a, 21b of the two-cored ferrule 20 (core/clad 21b in the example of FIG. 2) and an optical axis of the lens 22 must be in an equal state to the angle φ' defined between the outgoing light emitted from the other core/clad 21a through the lens 22 and the optical axis of the lens 22.

Accordingly, the second embodiment has a prism 26 in a unique form arranged, as shown in FIG. 2, on the light propagation path. The prism 26 has an outgoing light refracting portion 33 and a returning light refracting portion 34 serving as a propagation light path changing element. The outgoing light refracting portion 33 has a structure to refract the outgoing light outputted from the lens 22 (light having an inclination φ' relative to the optical axis of the lens 22) to make parallel the propagation direction of the outgoing light with the optical axis of the lens 22. The returning light refracting portion 34 is structured to refract the returning light totally reflected by the retro-reflector 25 (light parallel with the optical axis of the lens 22) and make it incline at nearly the same angle φ' as that of the outgoing side relative to the optical axis of the lens 22, thereby making it incident on the lens 22.

Incidentally, the inclination φ' can be determined by Equation 3.

$$\phi'=\tan^{-1}(D/(2fa))(\text{rad}) \qquad [\text{Equation 3}]$$

Incidentally, D in Formula 3 designates a spacing between the optical axis of the core/clad 21a and the optical axis of the core/clad 21b, and fa designates a spacing between the tip of the core/clad 21a, 21b and the principal plane of the lens 22.

Meanwhile, the spacing between the intersection P of outgoing light and returning light and the principal plane of the lens 22 is equal to the spacing fa between the tip of the core/clad 21a, 21b and the principal plane of the lens 22. The prism 26 is theoretically, preferably arranged such that the prism 26 at its portion on the collimator side is arranged at the intersection P of the outgoing light and returning light. However, the outgoing light and returning light actually has a beam diameter. Accordingly, the prism 26 is preferably spaced from the intersection P of outgoing light and returning light as shown in FIG. 2, in order not to apply the beam to a intersecting point of the outgoing light refracting portion 33 and the returning light refracting portion 34.

According to the second embodiment, structurally made parallel are the propagation path of the outgoing light of from the polarizer 6 to the retro-reflector 25 as a total reflecting element and the propagation path of the returning light totally reflected by the retro-reflector 25 and directed toward the polarizer 6, and further the structure is provided to refract the returning light and incident and propagated onto the core/clad 21b of the two-cored ferrule 20 serving as an outputting optical fiber of the collimator 19. Consequently, the spacing fb between the principal plane of the lens 22 and the retro-reflector 25 can be properly set regardlessly of the spacing fa between the tip of the core/clad 21a and the principal plane of the lens 22. This makes it possible to employ a general-purpose collimator 19, thus reducing the size and cost of the variable optical filter unit 2 or variable-gain equalizing system 1.

Explanation will be made below on a third embodiment.

Figure 3A:
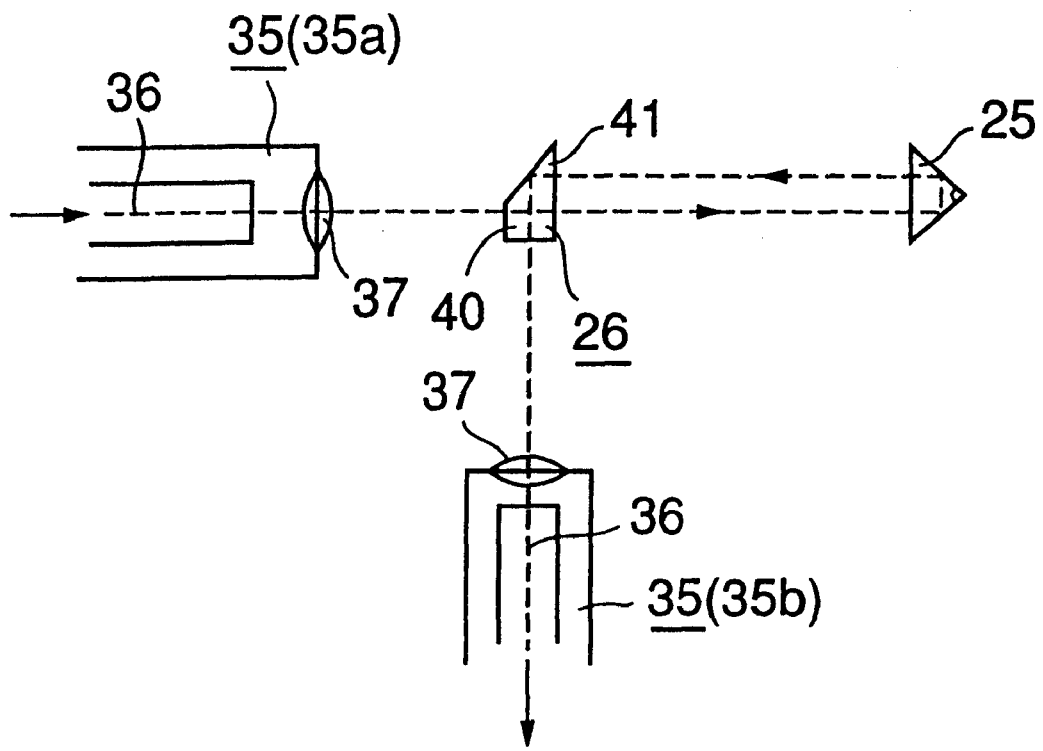
FIGS. 3A and 3B is a model diagram typically showing a variable optical filter unit featured in a third embodiment.
Figure 3B:
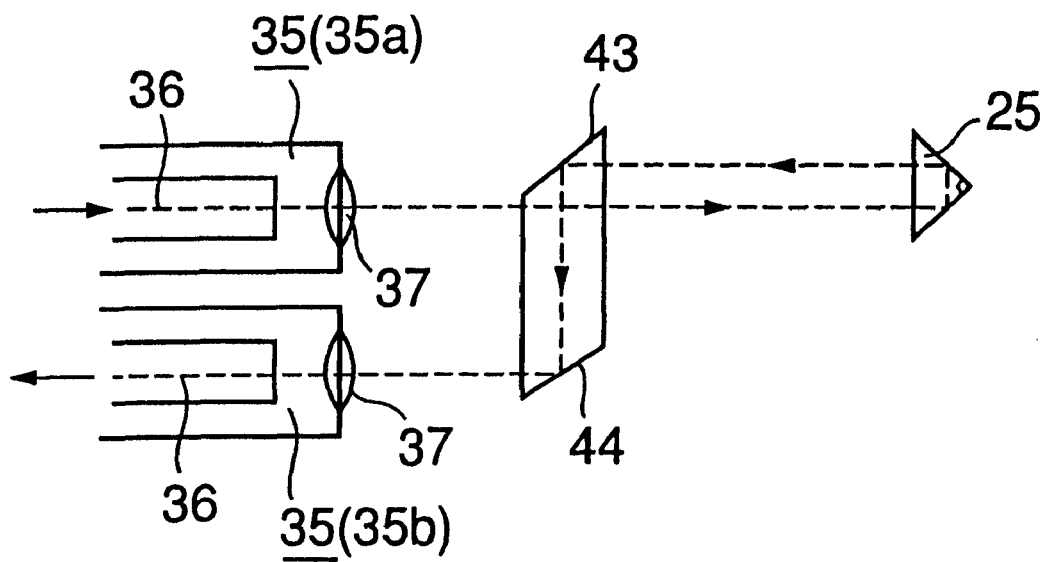

A variable optical filter unit featured in a variable-gain equalizing system of the third embodiment uses a single-cored collimator 35 (35a, 35b) as shown in FIGS. 3A and 3B in place of employing a collimator 19 using a two-cored ferrule 20 as shown in the foregoing embodiments. The third embodiment is featured by the use of the single-cored collimator 35 and the unique structure given by using the collimator 35. The other structures are similar to those of the foregoing embodiments. In explaining the third embodiment, the same structural parts as those of the foregoing variable-gain equalizing system 1 and variable optical filter unit 2 are designated with the same reference characters to omittedly explain the duplication on the common parts. Incidentally, although the variable optical filter unit 2 shown in FIGS. 3A and 3B has a polarizer 6, a Faraday rotator 7, a linear retarder 8, a magnetic field applying device 11 and temperature control device 13 similarly to those shown in the foregoing embodiment, they are omittedly shown in FIGS. 3A and 3B.

The single-cored collimator 35 is integrated with one optical fiber 36 and a lens 37 with their optical axes aligned. The third embodiment has two collimators 35 one of which (collimator 35a in the example of FIGS. 3A, 3B) servers as an input collimator while the other (collimator 35b) serves as an output collimator.

In the example shown in FIG. 3A, the collimators 35a, 35b are arranged with their optical axes intersected (perpendicularly arranged in the example shown in FIG. 3A). Also, a prism 26 having a parallel plate portion 40 and a total reflecting portion 41 is provided on the light propagation path. The parallel plate portion 40 is a portion to transmit light without changing the propagation direction thereof. The total reflecting portion 41 is a portion for light to be incident thereon at an angle greater than a critical angle thereby totally reflecting the incident light. Namely, the total reflecting portion 41 serves as a total reflecting element to totally reflect the returning light toward the outputting collimator.

In the example shown in FIG. 3A, the outgoing light outputted from the input collimator 35 a transmits through the parallel plate portion 40 of the prism 26 and travels toward the retro-reflector 25 where it is totally reflected with an optical-path deviation Y by the retro-reflector 25 and travels toward the prism 26. The returning light is changed in propagation direction to a direction toward the output collimator 35b by the total reflecting portion 41 of the prism 26.

In the example shown in FIG. 3B, the collimators 35a, 35b are arranged side by side with their optical axes positioned parallel. Meanwhile, there are provided a first total reflecting element (e.g. total reflecting mirror) 43 and a second total reflecting element (e.g. total reflecting mirror) 44. The returning light totally reflected by the retro-reflector 25 is changed in its propagation direction by the total reflecting element 43 from a state parallel with the outgoing light propagation path to a direction toward the second total reflecting element 44. The light is further changed by the second total reflecting element 44 to a direction coincident with the optical axis of the outputting collimator 35b, thus being incident and propagated onto the outputting collimator 35b. Namely, the example shown in FIG. 3B forms a propagation light path changing element by the first total reflecting element 43 and the second total reflecting element 44.

In also the third embodiment, the spacing between the lens 37 and the retro-reflector 25 can be properly set without being regulated by the spacing between a tip of an optical fiber 36 of the collimator 35 and the lens 37, similarly to the foregoing embodiments. Consequently, a general-purpose single-cored collimator 35 can be employed. Furthermore, because there is no need to increase the spacing between the tip of the optical fiber 36 and the lens 37, it is possible to provide a small-sized variable optical filter unit 2 and a variable-gain equalizing system 1 using the same.

Note that this invention is not limited to the foregoing embodiments but can take various embodiments. For example, although the foregoing embodiments arranged the polarizer 6, the Faraday rotator 7 and the linear retarder 8 in this order, the order of arrangement of the Faraday rotator 7 and the linear retarder 8, for example, are not limitative, i.e. the linear retarder 8 and the Faraday rotator 7 may be arranged in the order closer to the polarizer 6. In this case, the similar effects to those of the foregoing embodiments can be offered.

Meanwhile, although the foregoing embodiments interposed the prism 26 as a propagation light path changing element and first and second total reflecting elements 43, 44 between the collimator 19, 35 and the polarizer 6, the propagation light path changing element is not limited in arrangement position. For example, it may be arranged anywhere on the light propagation path at from the polarizer 6 to the retro-reflector as a total reflecting element. It is however noted that the polarizer 6, the Faraday rotator 7 and the linear retarder 8 are structured to pass both of outgoing light and returning light.

Furthermore, in the foregoing embodiments, the monitor device 3 of the variable gain equalizing system 1 monitored the input signal light to the variable gain equalizing system 1. It is possible to structure such that, for example, the monitor device 3 is provided on an output side of the variable gain equalizing system 1 to feedback-control each variable optical filter unit 2.

Furthermore, although in the foregoing embodiments the temperature control device was provided as a phase difference varying device on the linear retarder 8, a variable phaser using a Faraday rotator may be provided as a phase difference changing device as described before.

Figure 4:
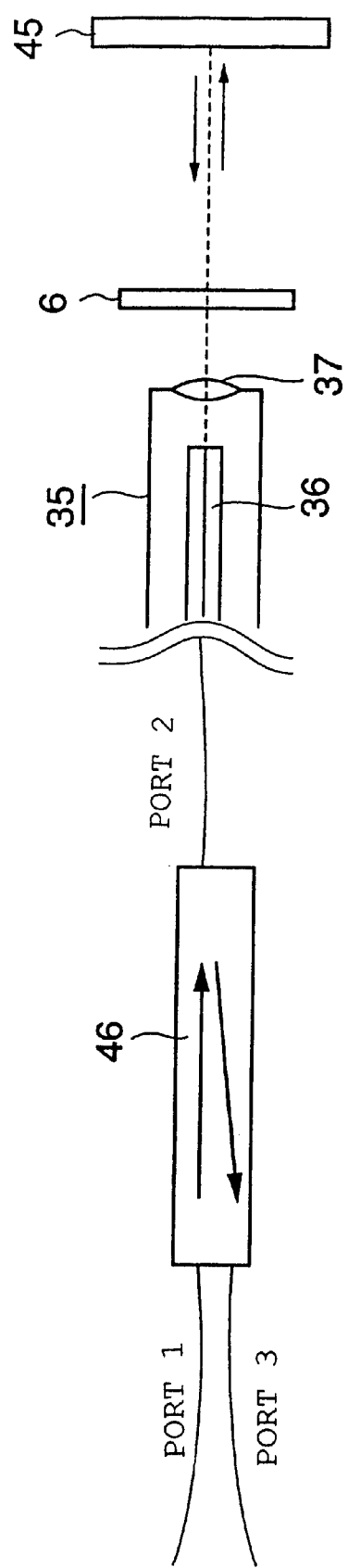
FIG. 4 is an explanatory diagram showing a modification in the present invention.
Figure 6A:
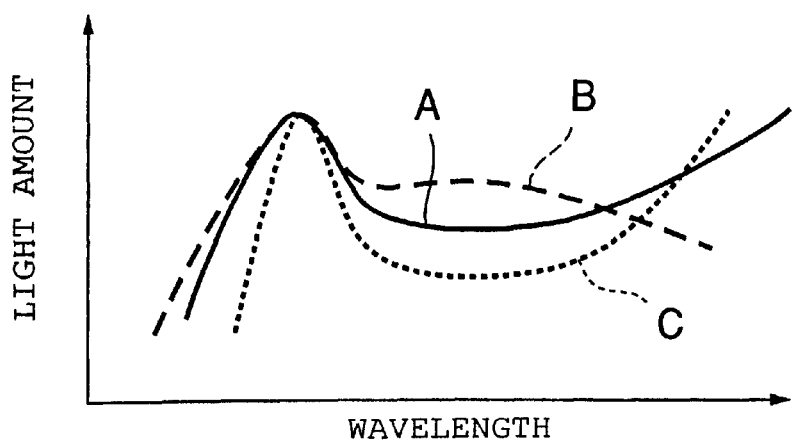
FIGS. 6A, 6B and 6C is a graph showing a wavelength characteristic pattern example of input signal light in the variable gain equalizing system of FIG. 5, a light attenuation amount wavelength characteristic possessed by the variable gain equalizing system, and a wavelength characteristic pattern example of output signal light in the variable gain equalizing system.
Figure 6B:
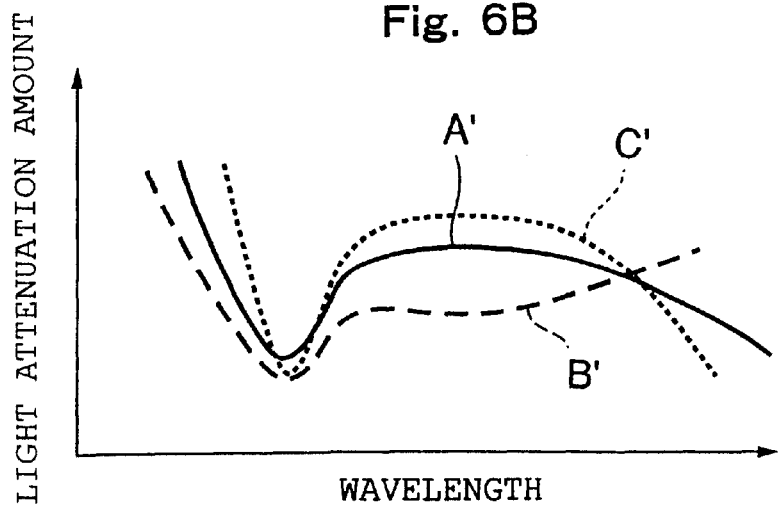
Figure 6C:
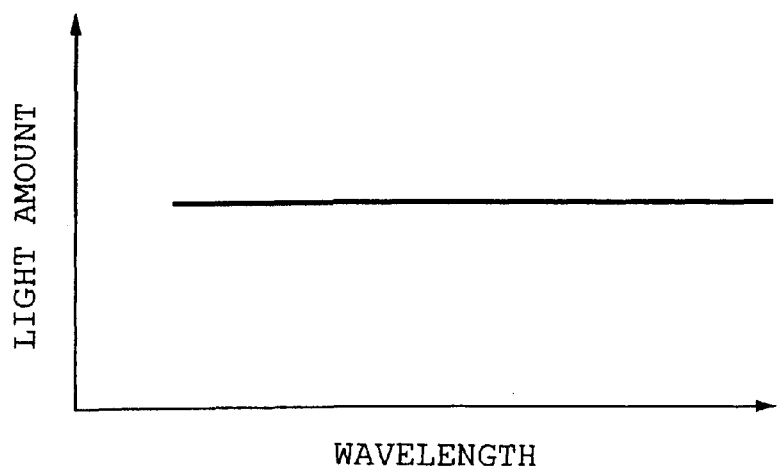
Figure 8:
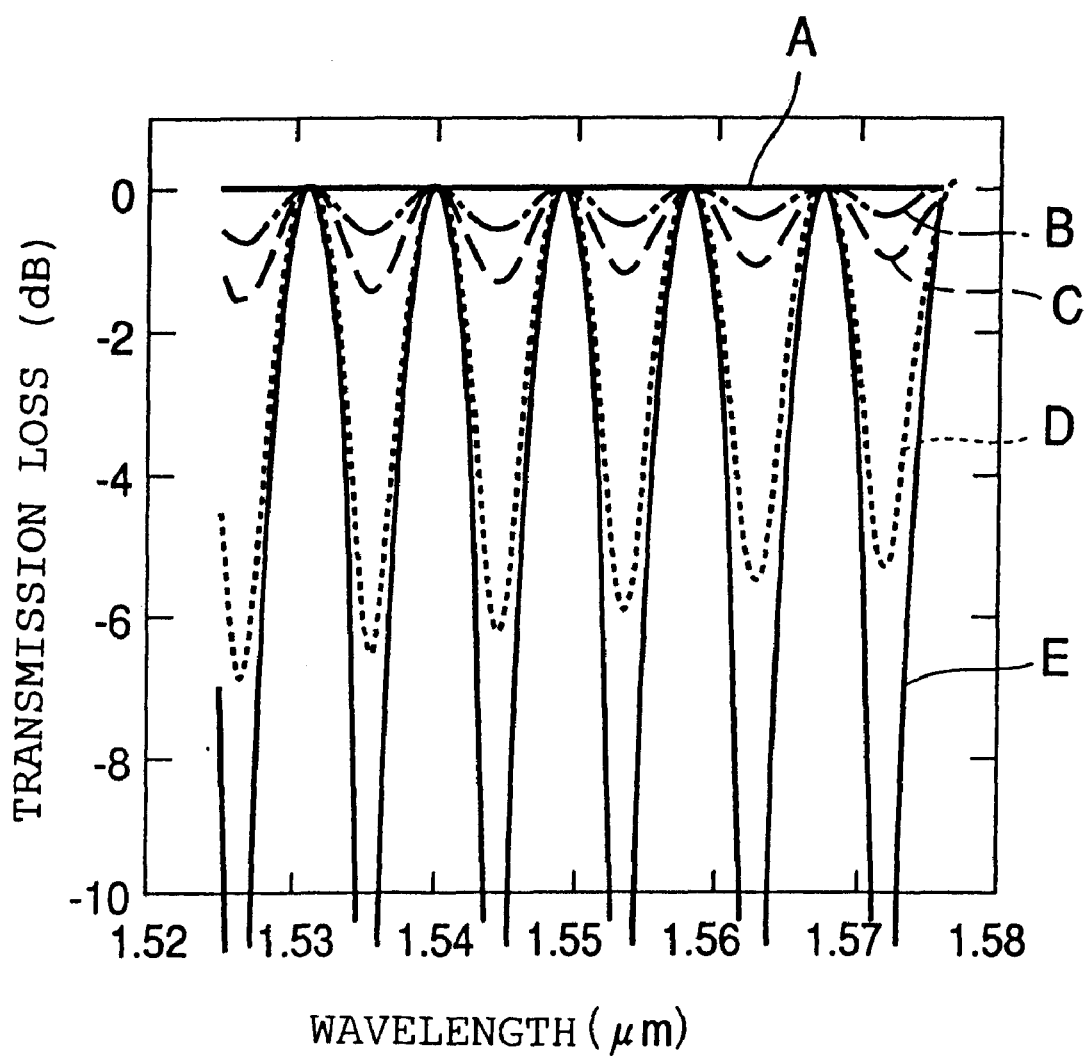
FIG. 8 is a graph showing one example of sinusoidal-like waveform change in light attenuation amount wavelength characteristic of the variable optical filter unit where varied is the rotation angle (Faraday rotation angle) in a light polarization state due to a Faraday rotator, in the variable optical filter unit of FIG. 7.
Figure 9:
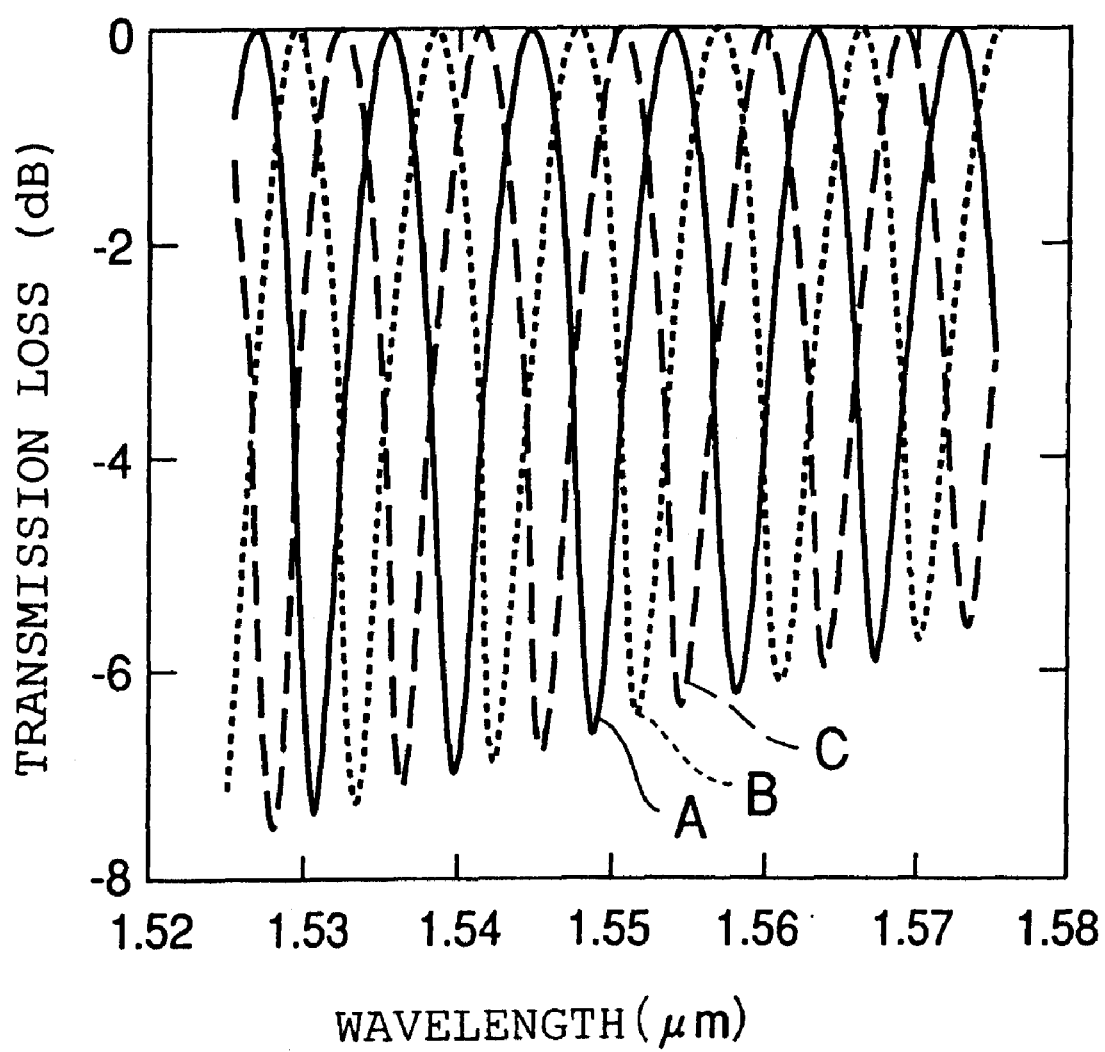
FIG. 9 is a graph showing one example of sinusoidal-like waveform change in light attenuation amount wavelength characteristic of the variable optical filter unit where varied is the temperature of a linear retarder, in the variable optical filter unit of FIG. 7.

Furthermore, it is possible to adopt a structure as shown in FIG. 4. In the example shown in FIG. 4, a total reflecting mirror 45 is provided as a total reflecting element instead of the retro-reflector shown in the foregoing embodiments. This provides a structure coincident between the propagation passage of the outgoing light in a direction of from the polarizer 6 to the total reflecting mirror 45 and the propagation passage of the returning light in a direction of from the total reflecting mirror 45 to the polarizer 6.

Meanwhile, as shown in FIG. 4, an optical fiber 36 using a single-cored collimator 35 and connected at one end to the collimator 35 is provided with an optical circulator 46. The optical circulator 46 is an optical part having an output the light inputted at the port 1 through the port 2 shown in FIG. 4 and output the light inputted at the port 2 through the port 3. The light inputted at the port 1 propagates into the optical fiber 36 through the port 2, to be outputted from a tip of the optical fiber 36 through a lens 37 toward the polarizer 6.

Meanwhile, the returning light totally reflected by the total reflecting mirror 45 enters and propagates through the optical fiber 36 via the lens 37, and then enters the optical circulator 46, being outputted at the port 3.

In also the case shown in FIG. 4, the spacing between the principal plane of the lens 37 and the total reflecting mirror 45 can be properly set regardless of the spacing between the tip of the optical fiber 36 and the principal plane of the lens 37, similarly to the foregoing embodiment. Accordingly, it is possible to use a general-purpose collimator 35 and provide an inexpensive, small-sized variable optical filter unit 2 and a variable gain equalizing system 1 using the same.

According to the present invention, because the propagation light path changing device is provided, the propagation light path changing device can input and propagate the returning light totally reflected by the total reflecting element to the output optical fiber of the collimator, without the necessity to make the spacing between the optical fiber tip of the collimator and the lens principal plane equal to the spacing between the lens principal plane of the collimator and the total reflecting element. This makes it possible to use a general-purpose collimator and provide an inexpensive, small-sized variable optical filter unit and a variable gain equalizing system using the same.

In the case that the total reflecting element is structured by a retro-reflector, made parallel are the propagation path of the outgoing light in a direction of from the polarizer to the retro-reflector and the propagation path of the returning light in a direction of retro-reflector to the polarizer, thereby enhancing the freedom in arrangement of the optical elements such as a polarizer and Faraday rotator.

In the case that a prism is provided as a propagation light path changing device or a parallel plate portion is provided in the prism, because the prism is an inexpensive element, it is possible to promote cost reduction for the variable optical filter unit and a variable gain equalizing system using same.

In the case having an inputting collimator and outputting collimator, the spacing between an inputting optical fiber and an outputting optical fiber can be properly set, making possible to enhance the freedom in design of a variable optical filter unit.

In also the case that the optical fiber connected to the collimator is provided with an optical circulator and wherein coincident are the propagation path of the outgoing light in a direction of from the collimator to the total reflecting element and the propagation passage of the returning light totally reflected by the total reflecting element and directed toward the collimator, there is no need to make the spacing between the optical fiber tip and the lens principal plane of the collimator equal to the spacing between the lens principal plane of the collimator and the total reflecting device. This makes it possible to use a general-purpose collimator and provide an inexpensive, small-sized variable optical filter unit and a variable gain equalizing system using the same.

What is claimed is:

1. A variable optical filter unit having a sinusoidal-like light attenuation amount wavelength characteristic having a collimator integrated with an input optical fiber and an output optical fiber that are arranged side by side and a lens arranged with a spacing to a tip of said input and output optical fibers commonly for input and output, said variable optical filter unit comprising:

arranged on a light exit side of said collimator, in an order,
a polarizer; and
a total reflecting element for totally reflecting a signal light to return a propagation direction of the light;
provided between said polarizer and said total reflecting element
a Faraday rotator for rotating a polarizing plane of an incident light according to an applied magnetic field;
a birefringence crystal for providing, depending on a wavelength, a phase difference between a component propagating with polarization in a crystal optical axis direction and a component propagating with polarization in a direction orthogonal thereto; and
a phase difference changing device for changing, without depending on the wavelength, the phase difference between the component propagating with polarization in the crystal optical axis direction and the component propagating with polarization in the direction orthogonal thereto;
a propagation light path changing device being provided to input and propagate a returning light totally reflected by said total reflecting element onto said output optical fiber of said collimator.

2. A variable optical filter unit according to claim 1, wherein said total reflecting element comprises a retro-reflector having a first total reflecting surface and a second total reflecting surface that are orthogonal to each other, the first total reflecting surface being provided having an inclination of approximately 45 degrees relative to a propagation direction of an incident light to totally reflect the incident light toward the second total reflecting surface, the second total reflecting surface being structured to totally reflect a light from the first total reflecting surface toward said polarizer, said retro-reflector making parallel, through a spacing, a propagation path of an outgoing light in a direction from said polarizer to said retro-reflector and a propagation path of a return light in a direction from said retro-reflector to said polarizer.

3. A variable optical filter unit according to claim 2, wherein said collimator has a structure having an optical axis of said input optical fiber and an optical axis of said lens that are positioned on a same axis, said propagation light path changing device comprising a prism to refract a returning light to be incident on said output optical fiber through said lens of said collimator.

4. A variable optical filter unit according to claim 3, wherein a parallel plate portion is provided in said prism as said propagation light path changing device, to transmit an outgoing light exited through said lens from said input optical fiber of said collimator without changing a propagation direction thereof.

5. A variable optical filter unit according to claim 2, wherein said collimator comprises an input optical fiber and an output optical fiber that are symmetrically arranged about the optical axis of said lens, said propagation light path changing device comprising a prism to refract the returning light to be incident on said output optical fiber through said lens of said collimator, said prism having an outgoing light refracting portion to refract an outgoing light outputted through said lens from said input optical fiber and change a propagation direction of the outgoing light to a direction parallel with the optical axis of said lens of said collimator.

6. A variable optical filter unit according to claim 2, wherein provided are, an input collimator integrated with an input optical fiber and a lens arranged through a spacing to a tip of said optical fiber; and an output collimator integrated with an output optical fiber and a lens arranged through a spacing to a tip of said optical fiber in place of said collimator having both said input optical fiber and said output optical fiber.

7. A variable optical filter unit according to claim 6, wherein said input collimator and said output collimator are arranged side by side, said propagation light path changing device having a first total reflecting element and a second total reflecting element, said first total reflecting element totally reflecting the returning light toward said second total reflecting element, said second reflecting portion totally reflecting the returning light from said first total reflecting element toward said output optical fiber of said output collimator.

8. A variable optical filter unit according to claim 6, wherein said input collimator and said output collimator are arranged in such a manner that their optical axes are intersected thereof, said propagation light path changing device comprising a total reflecting element to totally reflect the returning light toward said output collimator.

9. A variable optical filter unit according to claim 1, wherein provided are, an input collimator integrated with an input optical fiber and a lens arranged through a spacing to a tip of said optical fiber; and an output collimator integrated with an output optical fiber and a lens arranged through a spacing to a tip of said optical fiber in place of said collimator having both said input optical fiber and said output optical fiber.

10. A variable optical filter unit according to claim 9, wherein said input collimator and said output collimator are arranged side by side, said propagation light path changing device having a first total reflecting element and a second total reflecting element, said first total reflecting element totally reflecting the returning light toward said second total reflecting element, said second reflecting portion totally reflecting the returning light from said first total reflecting element toward said output optical fiber of said output collimator.

11. A variable optical filter unit according to claim 9, wherein said input collimator and said output collimator are arranged in such a manner that their optical axes are intersected thereof, said propagation light path changing device comprising a total reflecting element to totally reflect the returning light toward said output collimator.

12. A variable gain equalizing system for compensating for wavelength characteristic variation in an input signal light, comprising:
a plurality of variable optical filter units having a sinusoidal-like light attenuation amount wavelength characteristics arranged in a propagation direction of the light, having a structure to produce a compensating light attenuation amount wavelength characteristic having a pattern form to compensate for a waveform characteristic of the input signal light by adding together sinusoidal-like light attenuation characteristics of said plurality of variable optical filter units, and having a structure for varying at least one of phase and amplitude of the sinusoidal-like light attenuation amount wavelength characteristics of said variable optical filter units depending on variation in a light attenuation amount wavelength characteristic of the input signal light, each of said variable optical filter units being a variable optical filter unit according to claim 1.

13. A variable optical filter unit having a sinusoidal-like light attenuation waveform characteristic having a collimator integrated with a tip of an optical fiber and a lens arranged on a side of the tip of said optical fiber through a spacing, said variable optical fiber filter unit comprising:

arranged on a light exit side of said lens of said collimator, in an order,
a polarizer; and
a total reflecting element for totally reflecting a signal light to return a propagation direction of the light;
provided between said polarizer and said total reflecting element
a Faraday rotator for rotating a polarizing plane of an incident light according to an applied magnetic field;
a birefringence crystal for providing, depending on a wavelength, a phase difference between a component propagating with polarization in a crystal optical axis direction and a component propagating with polarization in a direction orthogonal thereto; and
a phase difference changing device for changing, without depending on the wavelength, the phase difference between the component propagating with polarization in the crystal optical axis direction and the component propagating with polarization in the direction orthogonal thereto;
a propagation path of the returning light totally reflected by said total reflecting element and directed toward said collimator being coincident with a propagation path of the outgoing light directed from said collimator toward said total reflecting element, an optical circulator being interposed in an optical fiber connected to said collimator.

14. A variable gain equalizing system for compensating for wavelength characteristic variation in an input signal light, comprising:
a plurality of variable optical filter units having a sinusoidal-like light attenuation amount wavelength characteristics arranged in a propagation direction of the light, having a structure to produce a compensating light attenuation amount wavelength characteristic having a pattern form to compensate for a waveform characteristic of the input signal light by adding together sinusoidal-like light attenuation characteristics of said plurality of variable optical filter units, and having a structure for varying at least one of phase and amplitude of the sinusoidal-like light attenuation amount wavelength characteristics of said variable optical filter units depending on variation in a light attenuation amount wavelength characteristic of the input signal light, each of said variable optical filter units being a variable optical filter unit according to claim 13.

* * * * *